United States Patent [19]

Sutou

[11] Patent Number: 4,785,334

[45] Date of Patent: Nov. 15, 1988

[54] IMAGE FORMING APPARATUS

[75] Inventor: Masatoki Sutou, Okazaki, Japan

[73] Assignee: Minolta Camera Kabushiki Kaisha, Osaka, Japan

[21] Appl. No.: 133,296

[22] Filed: Dec. 15, 1987

[30] Foreign Application Priority Data

Dec. 17, 1986 [JP] Japan ................................. 61-300329

[51] Int. Cl.$^4$ ........................ G03B 13/24; G03B 13/26
[52] U.S. Cl. ........................................ 355/44; 355/51; 355/66
[58] Field of Search ........................ 355/44, 45, 50, 51, 355/66

[56] References Cited

U.S. PATENT DOCUMENTS

| | | | |
|---|---|---|---|
| 3,547,534 | 12/1970 | Akiyama et al. | 355/45 |
| 3,674,354 | 7/1972 | Artaud et al. | 355/45 |
| 3,733,128 | 5/1973 | Naumann et al. | 355/45 |
| 3,759,611 | 9/1973 | O'Connell et al. | 355/45 |
| 4,693,591 | 9/1987 | Saijo et al. | |

FOREIGN PATENT DOCUMENTS 60-118134 8/1985 Japan .

Primary Examiner—Monroe H. Hayes
Attorney, Agent, or Firm—Burns, Doane, Swecker & Mathis

[57] ABSTRACT

An image forming apparatus having a feed section being positioned at the front of the apparatus, a sheet discharging section being positioned above the feed section and a work table being attached to the front of the apparatus in a position above the sheet discharging section. The work table has a rotatable portion which is positioned above the feed section, and which is formed with an opening for taking out the sheet discharged from the discharging section. A support member is provided between the discharging section and the opening for supporting image-transferered sheets. When the rotatable portion is opened upwardly, the work table does not hinder the sheet supplementing work of the operator for the feed section.

6 Claims, 5 Drawing Sheets

IMAGE FORMING APPARATUS

BACKGROUND OF THE INVENTION

1. Field of the Invention

The present invention relates to an image forming apparatus such as, for example, a reader printer. More particularly, it is concerned with an image forming apparatus having a work table to improve the operatability for the operator who operates the image forming apparatus.

2. Description of the Prior Art

An image forming apparatus, e.g. a reader printer, is provided with a screen for the projection of images recorded on a microfilm and an image forming mechanism which is incorporated in the body of the reader printer for copying images on sheets. A work table for supporting, for example, a control board which is operated by the operator, is attached to the reader printer body. The operator sits facing the work table and performs operations such as retrieving the image recorded on the microfilm or copying the image on the sheet.

A plurality of sheet cassettes for receiving different sizes of sheets therein are removably inserted in the apparatus body so that desired images can be hard-copied on plural kinds of sheets using such a reader printer as referred to above. Further, there is provided a discharge tray for supporting copied sheets after image formation.

In Japanese Utility Model Laid Open No. 118134/1985, there is disclosed a reader printer in which the aforementioned discharge tray is attached to a side portion of the apparatus body. However, in the case where copied sheets are discharged from a side portion of the apparatus body as in the reader printer of the above utility model, the operator who sits facing the front of the apparatus body is required to move to the side when taking out the copied sheets. This requirement leads to deterioration of the working efficiency.

In U.S. Pat. No. 4,693,591, there is disclosed a reader printer of a structure in which sheet cassettes can be set removably from the front of the apparatus body and a discharge tray for receiving image-formed sheets therein is fixed to the front of the apparatus body. In this case, the operator can maintain his posture of facing the work table and in this posture it is possible for the operator to not only operate the control board but also perform other operations such as taking out hard copies from the discharge tray. In such a reader printer, however, since the discharge tray is attached to the front of the apparatus body, the work table cannot be extended to that portion, that is, the work table mounting space becomes narrower and so it becomes difficult for the operator to perform various operations toward the work table. On the other hand, if the work table is extended up to the portion of the discharge tray, it follows that the sheet cassettes and the discharge tray are positioned below the work table. As a result, the sheet cassettes and the discharge tray are covered with the work table and it becomes a dead angle for the operator. Thus, the sheet cassette removing and inserting operation at the time of supplementing sheets becomes complicated.

SUMMARY OF THE INVENTION

It is an object of the present invention to provide an image forming apparatus which permits the operator to perform both sheet supplementing operation and sheet taking-out operation after image formation while maintaining the operator's posture of facing the apparatus body.

It is another object of the present invention to provide an image forming apparatus in which a portion of a work table which is attached to the front of the apparatus is rotatable and is positioned above sheet cassettes, thereby, when said portion is opened upwards, it becomes easier to effect the operation of removing a sheet cassette and supplementing sheets, while when the said portion is brought down, it becomes possible to use it as the work table, thus making it possible to broaden the operator's working space.

It is a further object of the present invention to provide the image forming apparatus having a sheet take-out opening formed in the above rotatable portion and also having a small-sized discharge tray composed of an auxiliary support tray and main support tray, the auxiliary support tray being positioned in the sheet take-out opening and attached to the rotatable portion, and the main support tray being attached to the apparatus body.

It is a still further object of the present invention to provide the image forming apparatus having a work table, the work table having a cover member formed of a transparent material for opening and closing motion to vary the opening area of a sheet take-out opening formed in the work table.

It is a still further object of the present invention to provide the image forming apparatus having a support means capable of receiving image-transferred sheets therein even when the rotatable portion formed in the work table is in an opened condition.

It is a still further object of the present invention to provide the image forming apparatus capable of taking out sheets without passing through the opening formed in the rotatable portion of the work table even in an opened condition of the rotatable portion in the case where image-transferred sheets are relatively small in size.

It is a still further object of the present invention to provide the image forming apparatus having a guide member for guiding image-transferred sheets sent to discharge means in the case where the sheets are relatively large in size.

According to the present invention, there is provided an image forming apparatus having a work table at the front side thereof, comprising: means for forming an image on sheet; feed means which accomodates therein in a stacked state a plurality of sheets to be fed to said image forming means, said feed means being positioned under said work table; means for discharging the sheet with the image formed thereon, said discharge means being positioned between said work table and said feed means; said work table which has an upwardly rotatable portion, said rotatable portion being formed with an opening for taking out the sheet discharged from said discharge means; and means for supporting the sheet discharged from said discharge means, said sheet supporting means being positioned between said discharge means and said rotatable portion of the work table.

BRIEF DESCRIPTION OF THE DRAWINGS

FIGS. 1 to 4 illustrate an image forming apparatus according to an embodiment of the present invention, of which:

FIG. 1 is a perspective view thereof;

FIG. 2 is a sectional view of the body of the apparatus and a work table both shown in FIG. 1;

FIG. 3 is a perspective view of the work table, showing an upwardly rotated state of a rotatable portion of the work table; and FIG. 4 is a sectional view showing the rotatable portion of the work table as brought down backwards of the apparatus body.

FIGS. 5 to 7 illustrate an image forming apparatus according to another embodiment of the present invention, of which:

FIG. 5 is a sectional view showing a rotatable portion of the work table as rendered coplanar with the work table;

FIG. 6 is a sectional view showing the rotatable table portion as brought down backwards; and FIG. 7 is a perspective view showing the rotatable table portion as opened upwards.

DESCRIPTION OF THE PREFERRED EMBODIMENTS

Figure 1:
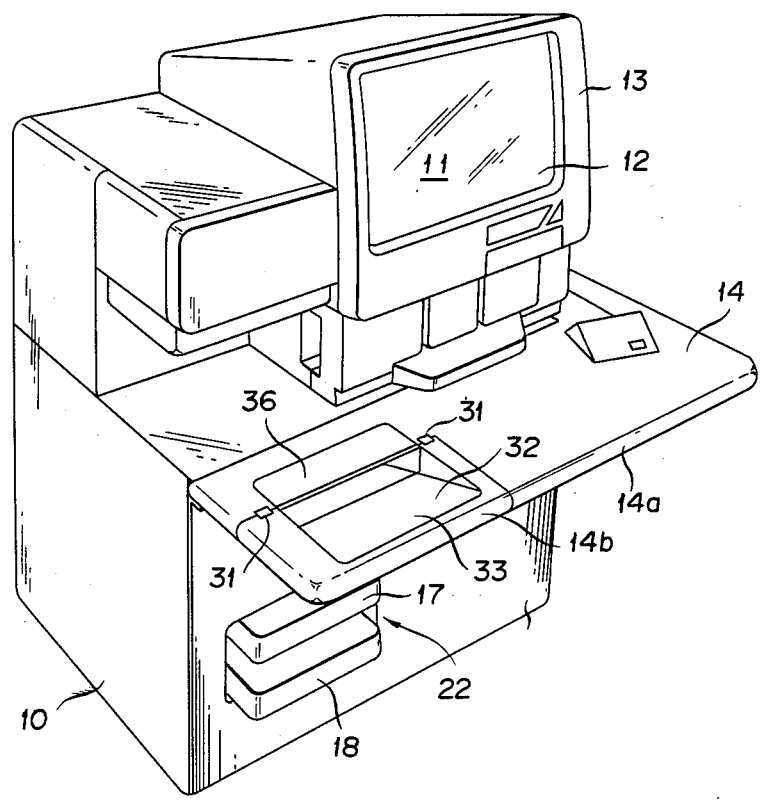
Figure 2:
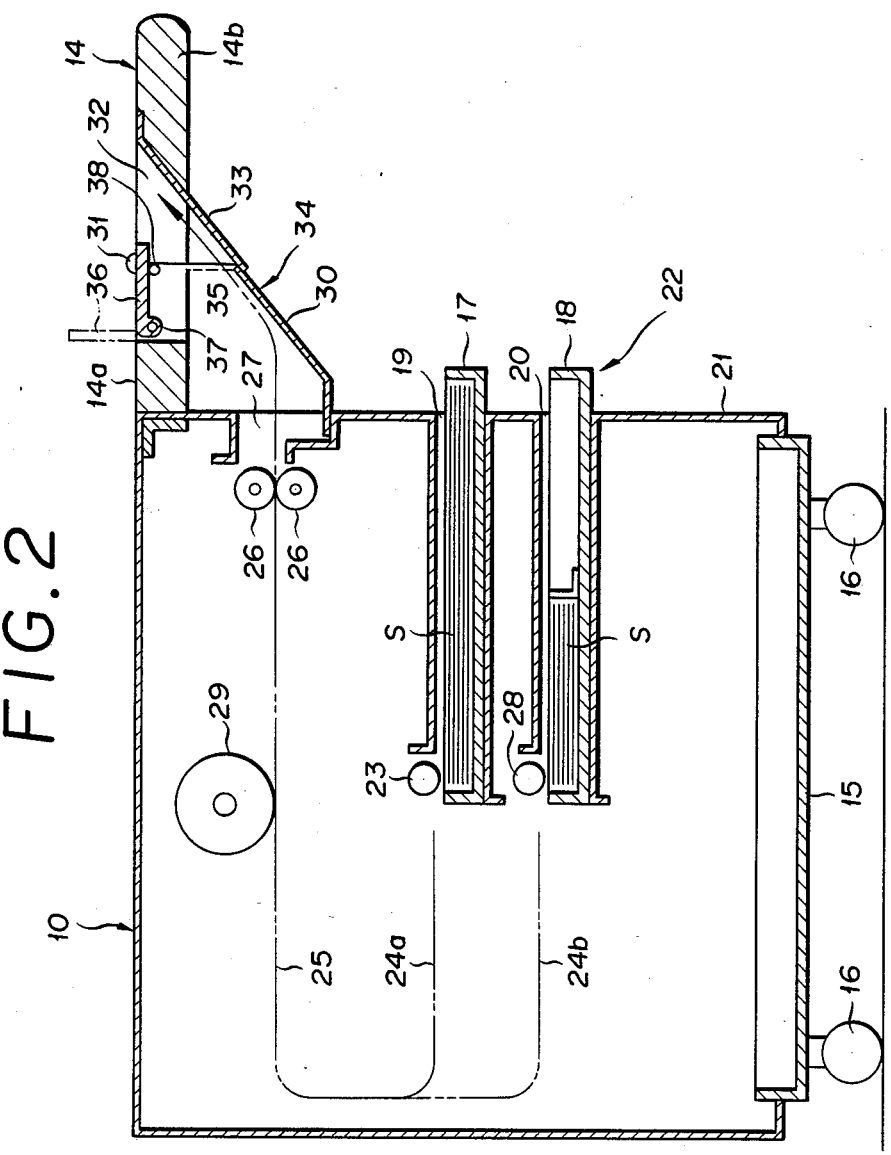

As shown in FIG. 1, an image projecting portion 11 having a screen 12 fitted in a bezel 13 is mounted on a reader printer body 10, and a work table 14 is fixed to the front side of the reader printer body 10 in a forwardly projecting fashion. The reader printer body 10, as shown in FIG. 2, is mounted on bedplate 15 having casters 16. Sheet cassettes 17 and 18 for accomodating predetermined sizes of sheets therein are removably inserted into the printer body 10 through openings 19 and 20 formed in a front wall 21 of the printer body 10. The sheet cassettes 17 and 18 constitute a sheet feed means 22.

The top sheet of sheets S stacked on the sheet cassette 17 is taken out from the cassette 17 by a feed roller 23, then passes through feed passages 24a and 25 and reaches the position between discharge rollers 26 which serve as discharge means. By the operation of the discharge rollers 26 the sheet is discharged from a discharge opening 27 formed in the front wall 21 of the body 10. Likewise, the top sheet of sheets S stacked on the sheet cassette 18 is taken out from the same cassette 18 by a feed roller 28, then passes through feed passages 24b and 25 and reaches the discharge rollers 26 whereby it is discharged from the opening 27.

Within the printer body 10 is provided a photosensitive drum 29 in an upper position thereof, around which is disposed a known image forming unit (not shown) comprising a charging unit, a developing unit, a transfering unit, etc. The said image forming unit and the photosensitive drum 29 constitute an image forming means, whereby an image is transferred onto the sheet S while the sheet passes through the feed passage 25. The thus image-formed sheet S then passes through an image fixing unit of a known structure (not shown) and is discharged from the opening 27 by means of the discharge rollers 26. To the front wall of the printer body 10 is fixed a main support tray 30 for receiving therein the image-transferred sheet S discharged from the opening 27.

To the upper end portion of the front wall of the printer body 10 is attached the work table 14 comprising a main table 14a and a rotatable table 14b which is rotatable through a hinge portion 31. The rotatable table 14b is formed with a sheet take-out opening 32 for discharging to the exterior the sheet S which has been discharged from the opening 27 by the discharge rollers 26 after image transfer thereon. Further, an auxiliary support tray 33 is attached to the rotatable table 14b to guide the sheet S onto the upper surface of the rotatable table 14b through the take-out opening 32. The main support tray 30 and the auxiliary support tray 33 constitute a support tray 34.

The main table 14a is formed with an opening 35 which is continuous to the sheet take-out opening 32. A cover member 36 formed of a transparent material such as an acrylic resin is attached to the main table 14a rotatably through a hinge portion 37 so as to cover the opening 35 and a portion of the take-out opening 32. The cover member 36 is normally closed with the fore end thereof being in contact with a lug 38 of the main table 14a which lug is positioned in the portion of the opening 35, as shown in FIG. 2. Particularly, when taking out a small-sized sheet received in the support tray 34, the operator can easily take it out by opening the cover member 36 as indicated with a phantom line in FIG. 2.

In using the image forming apparatus of such construction, the rotatable table 14b is normally closed so that it is flush with the main table 14a as shown in FIG. 1, whereby the auxiliary support tray 33 is combined with the main support tray 30 as a pair to constitute the support tray 34. The cover member 36 is also normally closed so as to be coplanar with the main table 14a. In this state there is attained a wide work table 14, so the operator can utilize a wide space in doing operations.

The sheets S thus image-formed are successively sent to the support tray 34 and stacked and received on the upper surface of the same tray by the operation of the discharge rollers 26. The operator can see this sheet-received state through the transparent cover member 36 and the take-out opening 32 and can take out the copied sheets S from the same opening. In the case of small-sized sheet, the operator can take it out easily by opening the cover member 36 upward.

Figure 3:
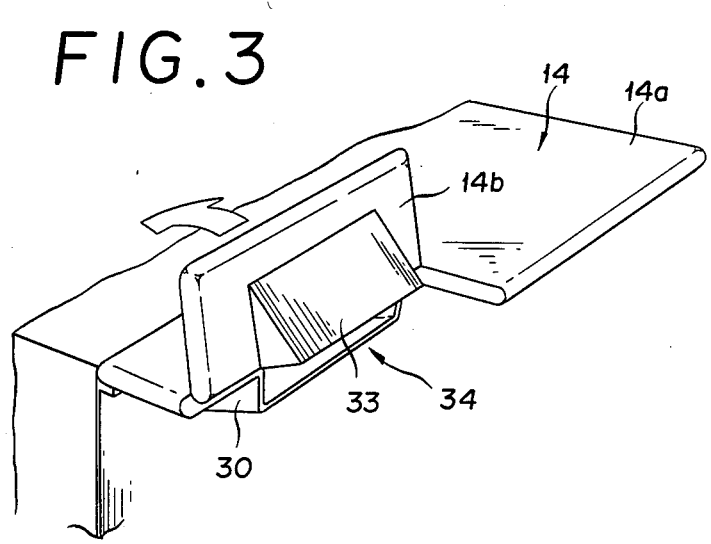
Figure 4:
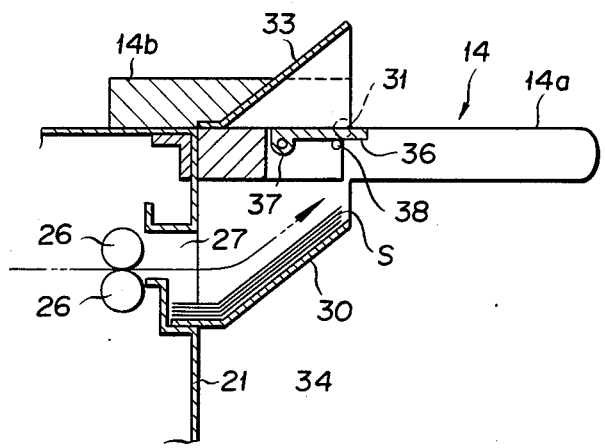

In the case of loading and unloading one or both of the sheet cassettes 17 and 18 to supplement sheets S therein, the rotatable table 14b is rotated up to its state shown in FIG. 3 and then brought down into an opened condition so that the surface thereof comes into contact with both the upper surface of the main table 14a and that of the reader printer body 10. With this movement, the auxiliary support tray 33 goes away from the main support tray 30, forming a space on this side of the main support tray 30. Even if an image-transferred sheet S is left on the support tray 34 during such rotating motion of the rotatable table 14b, the sheet S is still held on the main support tray 30, so it will never be an obstacle to the opening and closing of the rotatable table 14b. Thus, without removing any sheet S from the main support tray 30, the rotatable table 14b is opened and in this state it is possible to effect loading and unloading of the sheet cassettes 17 and 18. Through the above-metioned space formed by the rotatable table 14b in a retracted state, the operator can effect the cassette loading and unloading operation without being hindered by the work table 14 while seeing the sheet cassettes 17 and 18.

Figure 5:
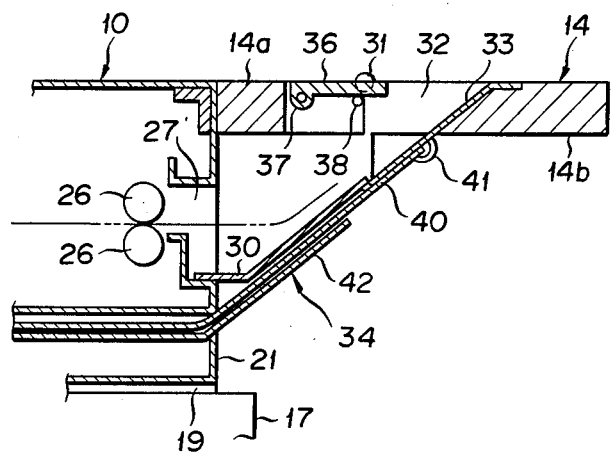
Figure 6:
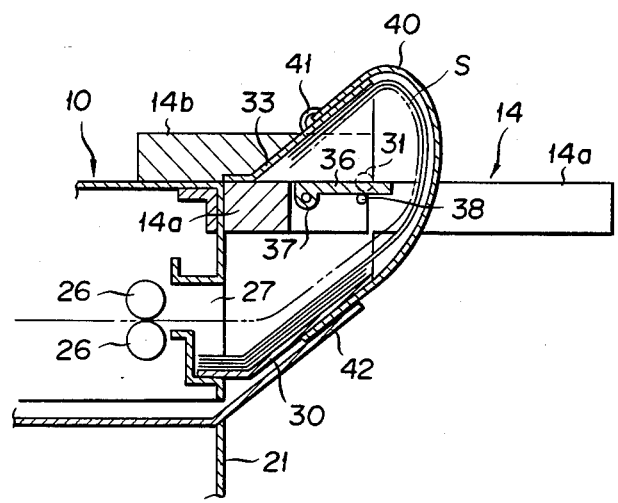
Figure 7:
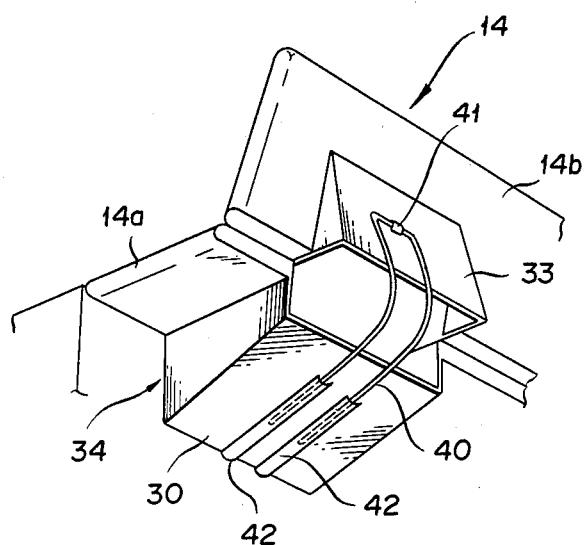

Referring now to FIGS. 5 to 7, there is illustrated another embodiment of the present invention, in which a flexible guide member 40 is secured to an auxiliary support tray 33 through a metal fitting 41, the flexible guide member 40 being constituted by a metallic or resinous wire and the two end portions thereof slidably fit in hollow receptable members 42 which are fixed to the outer surface of a main support tray 30. As shown in FIG. 5, in a closed state of the rotatable table 14b, a support tray 34 is formed by the main support tray 30 and the auxiliary support tray 33 and the longest portion of the guide member 40 is received in the receptacle members 42. When the rotatable table 14b is rotated in this state, the guide member 42 is delivered from the receptacle members 40 as shown in FIG. 7. Further, when the rotatable table 14b is opened, the guide member 40 is stretched in a curved state between the main support tray 30 and the auxiliary support tray 33 which is positioned away from the main support tray 30, as shown in FIG. 6.

According to this embodiment, even when image-transferred sheets S which are relatively large in size to the extent of projecting from the main support tray 30 are received in the support 34, the rotatable table 14b can be brought into the opened state shown in FIG. 6 from its closed state shown in FIG. 5 without wrinkling or bending of the sheets S or without dropping of the sheets from the main support tray 30. Thus, with the rotatable table 14b left open, it is possible to perform the transfer operation in a successive manner, and in this case the sheets S which have been delivered toward the support tray 34 are received therein in a curved state.

When the rotatable table 14b is returned from its opened state shown in FIG. 6 to its closed state shown in FIG. 5, the guide member 40 gets into the receptacle members 42 while supporting the sheets S. In place of the wire, a sheet-like member may be used as the guide member 40.

The image forming apparatus of the present invention is not limited to the above embodiments. Various modifications may be made within the scope of claim. For example, as the sheet feed means 22 there may be adopted an elevatory feed system to supplement the sheets S directly into the printer body 10, in place of using cassettes.

What is claimed is:

1. An image forming apparatus having a work table at the front side thereof, comprising:
   means for forming an image on a sheet;
   feed means which accomodates therein in a stacked state a plurality of sheets to be fed to said image forming means, said feed means being positioned under said work table;
   means for discharging the sheet with the image formed thereon, said discharge means being positioned between said work table and said feed means;
   said work table having an upwardly rotatable portion, said rotatable portion being formed with an opening for taking out the sheet discharged from said discharge means; and
   means for supporting the sheet discharged from said discharge means, said sheet supporting means being positioned between said discharge means and said rotatable portion of the work table.

2. An image forming apparatus according to claim 1, wherein said support means is divided into two portions which are a first portion extending from said discharge means toward said opening and a second portion attached to said rotatable portion of the work table and extending toward said discharge means.

3. An image forming apparatus according to claim 2, wherein when said rotatable portion of the work table is rotated, the sheet received in said first portion positioned away from said second portion can be discharged to the exterior directly without passing through the opening formed in the rotatable portion.

4. An image forming apparatus according to claim 2, further having means for guiding the sheet between said first and said second portion when said rotatable portion of the work table is rotated, said sheet guide means being positioned between the first and second portions of said support means.

5. An image forming apparatus according to claim 4, wherein said guide means is formed of a flexible material.

6. An image forming apparatus according to claim 1, wherein said work table has a cover member formed of a transparent material to cover said opening.

* * * * *